(12) United States Patent
Saikatsu et al.

(10) Patent No.: US 7,438,999 B2
(45) Date of Patent: Oct. 21, 2008

(54) DISPERSANTS FOR ORGANIC PIGMENTS

(75) Inventors: Hiroaki Saikatsu, Tokyo (JP); Shigeru Sakamoto, Tokyo (JP); Masanori Takakamo, Tokyo (JP); Seishichi Sasaki, Tokyo (JP); Hiromitsu Yanagimoto, Tokyo (JP); Yoshimasa Tsuchiya, Tokyo (JP); Tetsuo Fukuda, Tokyo (JP); Akio Yoshida, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 744 days.

(21) Appl. No.: 10/921,927

(22) Filed: Aug. 20, 2004

(65) Prior Publication Data

US 2005/0048384 A1   Mar. 3, 2005

(30) Foreign Application Priority Data

Aug. 27, 2003  (JP) ............................. 2003-302714

(51) Int. Cl.
*G02B 5/20* (2006.01)
*C09D 7/12* (2006.01)
*C09C 3/10* (2006.01)

(52) U.S. Cl. ............................ 430/7; 106/493; 106/494

(58) Field of Classification Search ........................ None
See application file for complete search history.

(56) References Cited

U.S. PATENT DOCUMENTS

| 4,692,189 A | 9/1987 | Bäbler et al. |
| 5,362,780 A | 11/1994 | Bäbler et al. |
| 5,693,446 A * | 12/1997 | Staral et al. .................. 430/201 |
| 2005/0048384 A1 | 3/2005 | Saikatsu et al. |

FOREIGN PATENT DOCUMENTS

WO  WO 02/48269 A1 *  6/2002

OTHER PUBLICATIONS

U.S. Appl. No. 11/354,112, filed Feb. 15, 2006, Saikatsu et al.
U.S. Appl. No. 11/276,811, filed Mar. 15, 2006, Nogami et al.
U.S. Appl. No. 11/398,654, filed Apr. 6, 2006, Yanagimoto et al.

* cited by examiner

*Primary Examiner*—John A. McPherson
(74) *Attorney, Agent, or Firm*—Oblon, Spivak, McClelland, Maier & Neustadt, P.C.

(57) ABSTRACT

A dispersant for an organic pigment contains a compound represented by the following formula (1):

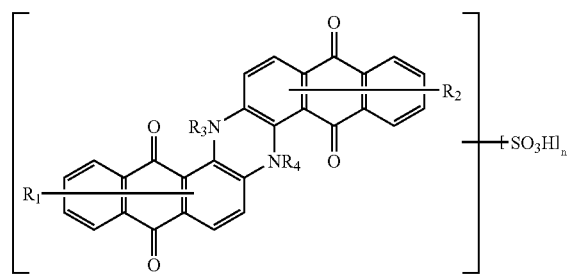

(1)

wherein $R_1$ and $R_2$ may be the same or different and each independently represents a hydrogen atom, a halogen atom, a hydroxyl group, a primary, secondary or tertiary amino group, an alkyl group, a substituted or unsubstituted aryl group or a substituted or unsubstituted phthalimidomethyl group, $R_3$ and $R_4$ may be the same or different and each independently represents a hydrogen atom or a lower alkyl group, and n means an average number of introduced sulfonic groups and stands for a number of from 0.5 to 3; or at least one salt selected from the group consisting of its metal salt, ammonium salt, organic amine salt, and organic quaternary ammonium salt. Also disclosed are a readily-dispersing pigment composition, a pigment dispersion, a colored coating fluid for color filters, a fabrication process of a color filter and a color filter, all of which make use of the dispersant.

13 Claims, 1 Drawing Sheet

FIG.1

DISPERSANTS FOR ORGANIC PIGMENTS

BACKGROUND OF THE INVENTION a) Field of the Invention

This invention relates to dispersants for organic pigments, readily-dispersing pigment compositions, pigment dispersions, colored coating fluids for color filters (colored coating fluids, which are colored with pigments, will hereinafter be called simply "coating fluids"), a process for the fabrication of color filters, and color filters.

b) Description of the Related Art

A color filter for use in a liquid crystal display or the like is fabricated primarily by a so-called pigment dispersion process (i.e., a process making use of a pigment as a colorant), specifically by applying a coating fluid, which has been prepared by dispersing a pigment in a photoresist (a solution of a photosensitive resin), to a substrate for the color filter by a coating method such as spin coating or by electrodeposition, exposing the thus-formed, colored coating film to radiation, and then developing and patternizing the coating film to form pixels, and repeating the above-mentioned process until RGB (red, green and blue) pixels are formed in predetermined patterns.

As a coloring pigment for a coating fluid to be used for the formation of blue pixels upon fabrication of the color filter, dioxazine violet (C.I. Pigment Violet 23) has been employed for the purpose of a color correction (toning) in addition to ε-phthalocyanine blue (C.I. Pigment Blue 15:6). Especially to provide blue pixels of color filters for TV monitors, the demand for which has been considerably increasing in recent years, with more preferred color quality, it is required to increase the proportion of dioxazine violet relative to ε-phthalocyanine blue.

Upon dispersing the mixed pigment, which consists of ε-phthalocyanine blue and dioxazine violet in a dispersion medium such as a photoresist, simple dispersion by a conventional disperser is unable to achieve full dispersion of the mixed pigment. If blue pixels are formed from a coating fluid so obtained, the pixels lack of light permeability, and as blue pixels of a color filter, are insufficient in light transmittance. The coating fluid with the above-described mixed pigment contained therein is, therefore, insufficient as a coating fluid for color filters.

As a resin commonly used in a photoresist as a dispersion medium for the above-described mixed pigment, on the other hand, a high acid value acrylic polymer is principally employed to permit the development of a colored coating film with an aqueous alkaline solution after exposure. With the coating fluid formed of the mixed pigment and the photoresist which contains the high acid value acrylic polymer, however, there are problems in that the pigment is prone to flocculation so that the viscosity of the coating fluid tends to become higher and also in that with time, the coating fluid becomes more viscous and deteriorates in storage stability.

To form pixels of each color for a color filter with a coating fluid which involves problems as described above, the coating fluid is applied to a substrate by spin coating, and the resulting coating film is then exposed and developed for its patternization. If the coating fluid so employed has high viscosity or it shows thixotropic viscosity due to flocculation of the pigment, the coating film formed of the coating fluid has a rise around an central part thereof (before its exposure). When a color filter is fabricated for use in a large-screen LCD, there is a problem in that unevenness and/or a difference arises in hue between pixels at a central part of the substrate and those at its peripheral part.

A coating fluid for color filters generally contains a pigment in a high concentration range of from 5 to 20 wt. %. Nonetheless, the coating fluid is required to have such a state of dispersion that its pigment particles do not undergo flocculation, it has a lower viscosity than ordinary room-temperature drying coating formulations or baking coating formulations, and it is excellent in storage stability.

To meet the above-described requirements, various methods have been proposed to date, such as adding a substituted derivative of phthalocyanine blue or a substituted derivative of dioxazine violet as a dispersant to the pigment where the pigment is ε-phthalocyanine blue or treating the pigment with the above-described derivative. Reference may be had, for example, to JP-A-56-167762, JP-A-1-34268, JP-A-4-246469, JP-A-6-240161, JP-A-6-240162 and JP-A-7-188576.

From a demand for further improvements in the performance of color filters, on the other hand, it has become increasingly needed to improve the transparency of color pixels, to increase the contrast among lights transmitted through the color pixels, and also to increase the concentrations of pigments in the respective color pixels. With the method that uses the above-described pigment derivative as a dispersant for the dispersion of the pigment, however, it is difficult to provide the color pixels with improved transparency or to avoid an increase in viscosity and a reduction in storage stability, both of which take place due to an increase in the concentration of the pigment, by relying upon an improvement in the dispersibility of the pigment. There is, accordingly, an outstanding desire for improvements in these matters.

SUMMARY OF THE INVENTION

The present inventors have proceeded with extensive research to solve the above-described problems, which arise when the pigment derivative is used as a dispersant for a pigment upon preparation of a coating fluid of high pigment concentration for color filters, and hence, to develop a pigment dispersant capable of providing the coating fluid for color filters with improvement color quality and also with reduced viscosity. As a result, it has been found that certain specific indanthrone compounds act in smaller amounts as excellent dispersants for pigments, can achieve reductions in the viscosities of coating fluids for color filters, can prevent the coating fluids from increasing in viscosity and undergoing gelation, and also can improve the transparency of color pixels, said transparency being one of most important properties as color filters.

In one aspect of the present invention, there is thus provided a dispersant for an organic pigment, comprising a compound represented by the following formula (1):

(1)

wherein $R_1$ and $R_2$ may be the same or different and each independently represents a hydrogen atom, a halogen atom, a hydroxyl group, a primary, secondary or tertiary amino group, an alkyl group, a substituted or unsubstituted aryl group or a substituted or unsubstituted phthalimidomethyl group, $R_3$ and $R_4$ may be the same or different and each independently represents a hydrogen atom or a lower alkyl group, and n means an average number of introduced sulfonic groups and stands for a number of from 0.5 to 3; or at least one member selected from the group consisting of a metal salt thereof, an ammonium salt thereof, an organic amine salt thereof and an organic quaternary ammonium salt thereof.

Preferably, $R_1$ and $R_2$ each independently represents a hydrogen atom or a chlorine atom, and $R_3$ and $R_4$ each independently represents a hydrogen atom or a methyl group.

More preferably, the dispersant comprises an organic quaternary ammonium salt represented by the following formula (2):

(2)

wherein $R_1$ to $R_4$ and n have the same meanings as defined above, $R_5$ represents an alkyl group or an aryl group and, $R_5$s may be the same or different.

The organic pigment can be, for example, at least one organic pigment selected from the group consisting of dioxazine violet (C.I. Pigment Violet 23), indanthrone blue (C.I. Pigment Blue 60), ε-phthalocyanine blue (C.I. Pigment Blue 15:6), brominated phthalocyanine green (C.I. Pigment Green 36) and carbon black (C.I. Pigment Black 7).

In another aspect of the present invention, there is also provided a readily-dispersing pigment composition comprising an organic pigment and the above-described dispersant.

In a further aspect of the present invention, there is also provided a readily-dispersing pigment dispersion with an organic pigment dispersed by a dispersant in a dispersion medium, wherein the dispersant is the above-described dispersant.

In a still further aspect of the present invention, there is also provided a colored coating fluid for color filters, said colored coating fluid comprising an organic pigment dispersed with a dispersant in a resin varnish for color filters, wherein the dispersant is the above-described dispersant. The colored coating fluid may preferably comprise ε-phthalocyanine blue (C.I. Pigment Blue 15:6) and dioxazine violet (C.I. Pigment Violet 23) as the organic pigment. As proportions of ε-phthalocyanine blue (C.I. Pigment Blue 15:6) and dioxazine violet (C.I. Pigment Violet 23), 1 to 100 parts by weight of the latter can be contained per 100 parts by weight of the former.

In a still further aspect of the present invention, there is also provided a process for fabricating a color filter by forming color patterns of a red color, green color and blue color on a substrate for the color filter, which comprises forming at least the blue color pattern with the above-described colored coating fluid.

In a yet further aspect of the present invention, there is also provided a color filter fabricated by the above-described process.

The organic pigment dispersant according to the present invention can stably disperse various organic pigments in dispersion media for paints, printing inks and coating fluids for color filters. The readily-dispersing pigment composition and dispersion according to the present invention are useful as pigments for coating fluids for color filters and, when C.I. Pigment Blue 15:6 and C.I. Pigment Violet 23 are combined as pigments, can form blue pixels equipped with excellent spectral transmittance characteristics and high vividness, brightness and transparency and also, with a variety of superb fastness properties such as light fastness, heat resistance, solvent resistance, chemical resistance and waterproofness.

DETAILED DESCRIPTION OF THE INVENTION AND PREFERRED EMBODIMENTS

The present invention will next be described in further detail based on certain preferred embodiments.

Dispersant

The organic pigment dispersant according to the present invention comprises the compound represented by the formula (1) or at least one member selected from the group consisting of a metal salt thereof, an ammonium salt thereof, an organic amine salt thereof and an organic quaternary ammonium salt thereof. It is preferred that in the formula (1), $R_1$ and $R_2$ each independently represents a hydrogen atom or a chlorine atom and $R_3$ and $R_4$ each independently represents a hydrogen atom or a methyl group.

The compound represented by the formula (1) can be obtained, for example, by sulfonating an indanthrone compound with concentrated sulfuric acid, fuming sulfuric acid, chlorosulfonic acid, sulfur trioxide or the like by a conventional method. The number (n) of sulfonic groups introduced in the above reaction ranges from 0.5 to 3.0, preferably from 1.0 to 1.5. A number (n) smaller than 0.5 fails to obtain a dispersant having excellent dispersing ability, while a number (n) greater than 3.0 provides the compound of the formula (1) with increased water-solubility so that the ability of the compound (1) to become adsorbed on the surfaces of an organic pigment is reduced and its performance as a pigment dispersant is lowered. Therefore, numbers (n) outside the above range are not preferred.

The compound of the formula (1) can be used with its sulfonic group(s) being left in the free form. As an alternative, it is also useful when its sulfonic group(s) is (are) in a form converted to a salt with an alkali metal such as lithium, sodium or potassium, a salt with a multivalent metal such as calcium, barium, aluminum, manganese, strontium, magnesium or nickel, a salt with an organic amine such as a mono-, di- or tri-alkylamine, an alkylenediamine or a mono-, di- or tri-alkanolamine, or a salt with an organic quaternary ammonium compound.

Especially, a salt between the above-described compound of the formula (1) and an organic quaternary ammonium compound, which is represented by the following formula (2), is suited for its excellent compatibility with organic pigments.

benzyltrimethylammonium chloride, benzyltriethylammonium chloride, benzyltributylammonium chloride, trimethylphenylammonium chloride, and benzyldimethylammonium perchlorate. As a particularly preferred quaternary ammonium compound, tetraethylammonium chloride can be mentioned. The salt represented by the formula (2) can be obtained by reacting the above-described quaternary ammonium compound with the sulfonic acid compound represented by the formula (1). The quaternary ammonium compound is used in an amount substantially equivalent to the sulfonic group(s) in the sulfonic acid compound. The reaction between the sulfonic acid compound and the quaternary ammonium compound is effected by mixing them in an aqueous medium and adjusting the pH of the resultant mixture until it becomes weakly acidic.

The organic pigment dispersant according to the present invention is useful as a dispersant for various known organic pigments. The dispersant of the present invention is a substance tinged in a blue color, and is useful especially for the dispersion of C.I. Pigment Violet 23, C.I. Pigment Blue 60, C.I. Pigment Blue 15:6, C.I. Pigment Green 36 and C.I. Pigment Black 7. It is to be noted that the term "organic pigment" as used herein also includes carbon black.

Readily-Dispersing Pigment Composition

The readily-dispersing pigment composition according to the present invention comprises an organic pigment and the above-described dispersant of the present invention. As the proportions of the organic pigment and the dispersant of the present invention in the readily-dispersing pigment composition, it is preferred to use about 0.5 to 50 parts by weight, specifically 1 to 30 parts by weight of the dispersant per 100 parts by weight of the organic pigment. Use of the dispersant in a proportion smaller than 0.5 part by weight may makes it difficult to have the readily-dispersing pigment composition dispersed with sufficient stability in a dispersion medium in (2)

wherein $R_1$ to $R_4$ and n have the same meanings as defined above, $R_5$ represents an alkyl group or an aryl group and, $R_5$s may be the same or different.

As the organic quaternary ammonium compound used to obtain the salt of the formula (2), a tetraalkyl(or aryl)ammonium compound can be mentioned. Specific examples include tetramethylammonium chloride, tetraethylammonium chloride, tetrabutylammonium bromide, tetrabutylammonium hydroxide, trilaurylmethylammonium chloride, some instances. Use of the readily-dispersing pigment composition even in a proportion greater than 50 parts by weight, on the other hand, cannot bring about any substantial extra dispersing ability, and therefore, is disadvantageous from the standpoint of cost.

As a preparation method of the readily-dispersing pigment composition, it is only necessary to simply combine the organic pigment and the dispersant together. For examples, the following methods are preferred. Whichever method is relied upon, the organic pigment can be either a single organic pigment or a mixture of two or more organic pigments. This applies equally to the dispersant.

(1) A water-based slurry of the organic pigment and a water-based slurry of the dispersant are intimately mixed together, the resultant mixture is filtered, and then, the filter cake is washed with water, collected and dried to recover the organic pigment and dispersant as a composition.

(2) The organic pigment and dispersant are dissolved in concentrated sulfuric acid, the resulting concentrated sulfuric acid solution is poured into a large amount of water to make both of them precipitate at the same time, and then, the resultant precipitate is collected by filtration, washed with water and dried to recover the organic pigment and dispersant in the form of a solid solution.

(3) Both of them are wet-ground in the presence of a small amount of liquid in a ball mill or the like to form them into a fine powdery mixture.

The readily-dispersing pigment composition according to the present invention is effective for various coloring applications, for example, for the coloring of paints, printing inks, natural or synthetic resins, inks for writing instruments, inkjet inks, and the like. In particular, a readily-dispersing pigment composition making use of at least one organic pigment selected from C.I. Pigment Violet 23, C.I. Pigment Blue 60, C.I. Pigment Blue 15:6, C.I. Pigment Green 36 or C.I. Pigment Black 7 is useful as a colorant for a coating fluid for color filters.

Pigment Dispersion

The pigment dispersion according to the present invention features that in a pigment dispersion with an organic pigment dispersed with a dispersant in a dispersion medium, the dispersant is the dispersant according to the present invention. Preferred examples of the organic pigment are the same as those described above, and the proportions of the organic pigment and dispersant are also the same as those described above. The pigment dispersion can be obtained by dispersing the organic pigment with the dispersant of the present invention in a desired dispersion medium. As a dispersing method, the pigment dispersion can be obtained by adding the readily-dispersing pigment composition of the present invention to the desired dispersion medium and then dispersing the readily-dispersing pigment composition in the desired dispersion medium, or by adding the organic pigment and the dispersant of the present invention to the desired dispersion medium and then dispersing them in a desired disperser or grinder. Such a pigment dispersion can be used for similar applications as the above-described readily-dispersing pigment composition.

Coating Fluid for Color Filters

The coating fluid according to the present invention for color filters features that an organic pigment is dispersed with the dispersant of the present invention in a resin varnish for color filters. As the resin varnish for color filters, conventionally-known, photosensitive resin varnishes (photoresists) and non-photosensitive resin varnishes are both usable. Preferred examples of the organic pigment for use in the coating fluid, their combinations, and the proportions of the organic pigment and dispersant are as in the case of the above-described readily-dispersing pigment composition according to the present invention. Further, a method for the preparation of the coating fluid for color filters is similar to the above-described preparation method of the pigment dispersion except that the dispersion medium is a resin varnish for color filters.

When a blue, green or black pigment is used in the above-described coating fluid for color filters, a blue-colored coating fluid, a green-colored coating fluid or a black-colored coating fluid (for the formation of black matrices) is obtained, respectively. The use of the above-described C.I. Pigment Violet 23 provides a violet-colored coating fluid. The violet-colored coating fluid is not used by itself as a sole coating fluid for color filters, but is useful for toning a coating fluid that makes use of $\epsilon$-phthalocyanine blue as a blue pigment. Described specifically, spectral transmittance characteristics of a colored coating film formed from a blue-colored coating fluid are indicated by a curve A in FIG. 1, but as mentioned above in connection with the conventional art, the blue pixels of a color filter used in a TV monitor these days are required to have such spectral transmittance characteristics as indicated by a curve C in FIG. 1. The spectral transmittance characteristics A of the colored coating film formed from the blue-colored coating fluid can be modified closer to the characteristics indicated by the curve C in FIG. 1 by adding an appropriate amount of the violet-colored coating fluid, the spectral transmittance characteristics of which are indicated by a curve B in FIG. 1, to the blue-colored coating fluid, that is, as spectral transmittance characteristics of a coating film formed from the thus-prepared, mixed coating fluid.

Figure 1:
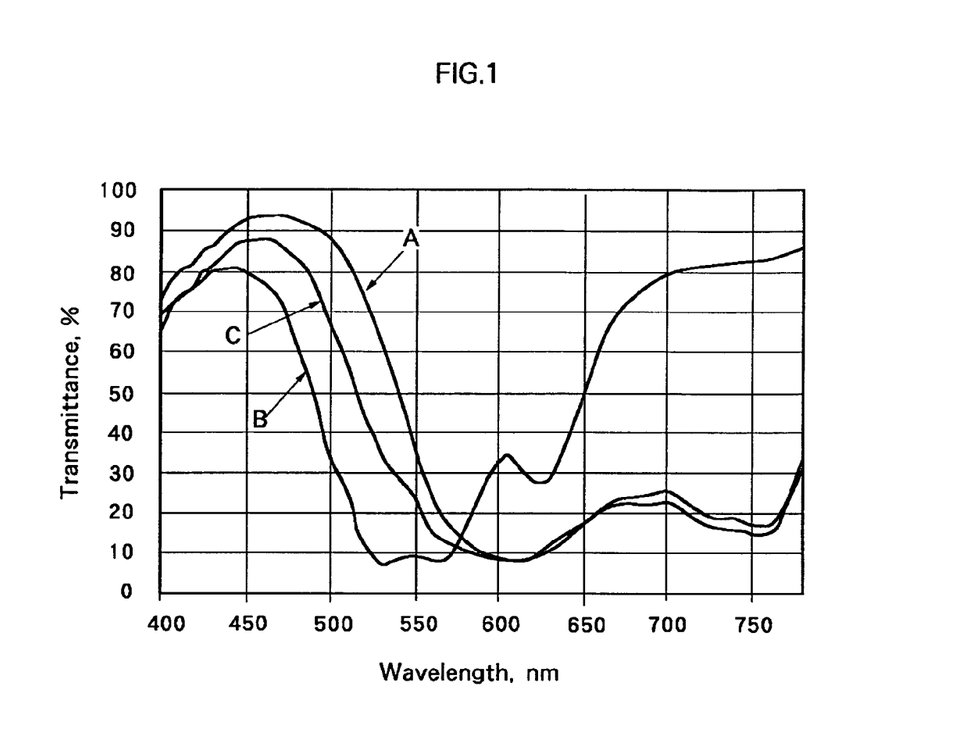
FIG. 1 is a diagram illustrating spectral transmittance characteristics of colored coating films.

In the present invention, a coating fluid for color filters, said coating fluid being capable of forming a coating film (pixels) equipped with the spectral transmittance characteristics indicated by the curve C in FIG. 1, can be prepared by dispersing the readily-dispersing pigment composition, which contains C.I. Pigment Blue 15:6 and C.I. Pigment Violet 23, in the above-described resin varnish or concurrently dispersing both of the pigments with the dispersant of the present invention in the above-described resin varnish. To obtain such spectral transmittance characteristics, C.I. Pigment Violet 23 should be used in a proportion of from 1 to 100 parts by weight, preferably from 3 to 50 parts by weight per 100 parts by weight of C.I. Pigment Blue 15:6.

Color Filter Fabrication Process

The process of the present invention for the fabrication of a color filter features that in a color filter fabrication process involving the formation of colored patterns of a red color, green color and blue color on a substrate for the color filter, at least the blue-colored pattern is formed by using the coating fluid of the present invention for color filters. Coating fluids for the colors other than the blue color can be separately prepared by a conventionally-known method. As the green-colored coating, the above-described blue-colored coating fluid according to the present invention can also be used. Incidentally, the fabrication itself of the color filter can be conducted by any process known to date.

EXAMPLES

The present invention will next be described more specifically based on Examples and Comparative Examples, in which all designations of "part" or "parts" and "%" are on a weight basis unless otherwise specifically indicated.

Examples on the Dispersant

Example A-1

Indanthrone blue (C.I. Pigment Blue 60) (30 parts) was added to 20% fuming sulfuric acid (300 parts), followed by a reaction at 60° C. for 6 hours. After cooling, there action mixture was caused to precipitate in ice water (3,000 parts), and the precipitate was collected by filtration and then washed with water to afford a water-based paste (110.2 parts, true amount: 33.8 parts) . The water-based paste was dried to obtain a blue powder (Dispersant 1, 33.1 parts), which was found to contain on average 1.1 sulfonic groups introduced per molecule from the results of an elemental analysis of sulfur and is represented by the following structural formula:

Dispersant 1

Example A-2

A water-based paste (48.9 parts, solid content: 15.0 parts) of Dispersant 1 obtained in Example A-1 was added to water (500 parts), and was thoroughly reslurried. Tetraethylammonium chloride (9.5 parts) were then added. The resultant mixture was stirred for 10 minutes, and with a 10% aqueous solution of sodium hydroxide, the mixture was gradually adjusted in pH until it became weakly acidic. Subsequent to stirring for 3 hours, the mixture was filtered and the filter cake was thoroughly washed with water to obtain a blue powder (Dispersant 2, 18.2 parts) represented by the following structural formula:

Dispersant 2

Example A-3

In a similar manner as in Example A-1 except for the use of N-methylindanthrone in place of C.I. Pigment Blue 60, was obtained Dispersant 3 represented by the following structural formula:

Dispersant 3

Example A-4

Dispersant 3 of Example A-3 and tetraethylammonium chloride were reacted in a similar manner as in Example A-2 to obtain a blue powder (Dispersant 4) represented by the following structural formula:

Dispersant 4

Example A-5

In a similar manner as in Example A-1 except for the use of N,N'-dimethylindanthrone in place of C.I. Pigment Blue 60, was obtained Dispersant 5 represented by the following structural formula:

Dispersant 5

Example A-6

Dispersant 5 of Example A-5 and tetraethylammonium chloride were reacted in a similar manner as in Example A-2 to obtain a blue powder (Dispersant 6) represented by the following structural formula:

Dispersant 6

Example A-7

In a similar manner as in Example A-1 except for the use of 4-chloroindanthrone in place of C.I. Pigment Blue 60, was obtained Dispersant 7 represented by the following structural formula:

Dispersant 7

Example A-8

Dispersant 7 of Example A-7 and tetraethylammonium chloride were reacted in a similar manner as in Example A-2 to obtain a blue powder (Dispersant 8) represented by the following structural formula:

Dispersant 8

Example A-9

In a similar manner as in Example A-1 except for the use of 5,5'-dichloroindanthrone in place of C.I. Pigment Blue 60, was obtained Dispersant 9 represented by the following structural formula:

Dispersant 9

Example A-10

Dispersant 9 of Example A-9 and tetraethylammonium chloride were reacted in a similar manner as in Example A-2 to obtain a blue powder (Dispersant 10) represented by the following structural formula:

Dispersant 10

Examples of the Readily-Dispersing Pigment Composition

Example B-1

A presscake (solid content: 26%) of C.I. Pigment Violet 23 was taken to give a pigment amount of 100 parts. Water (2,000 parts) was added, and the presscake was thoroughly reslurried. To the slurry, a presscake (solid content: 30%) of Dispersant 1 was added to give a solid content of 5 parts. The resulting mixture was stirred at high speed for 1 hour, and was then filtered. The filter cake was thoroughly washed with water and then dried at 80° C. to obtain Readily-dispersing pigment composition 1 (104 parts).

Example B-2

A presscake (solid content: 26%) of C.I. Pigment Violet 23 was taken to give a pigment amount of 100 parts. Water (2,000 parts) was added, and the presscake was thoroughly reslurried. To the slurry, a presscake (solid content: 35%) of Dispersant 2 was added to give a solid content of 5 parts. The resulting mixture was stirred at high speed for 1 hour. A 5% aqueous solution of sodium carbonate was gradually added dropwise until the mixture became weakly acidic. The thus-obtained mixture was stirred for 1 hour, and then filtered. The filter cake was thoroughly washed with water and then dried at 80° C. to obtain Readily-dispersing pigment composition 2 (104 parts).

Examples of the Pigment Dispersion

Example C-1

Added to an acrylic resin varnish (molecular weight: 12,000, solid content: 40%) (50 parts), which had been obtained by copolymerizing methacrylic acid, benzyl acrylate, styrene and hydroxyethyl acrylate at a molar ratio of 25:50:15:10, were C.I. Pigment Violet 23 (20 parts), Dispersant 1 (1 part) and a solvent (propylene glycol monomethyl ether acetate, hereinafter abbreviated as "PMA") (20 parts). Subsequent to premixing, the resulting mixture was subjected to dispersion in a horizontal beads mill to obtain a violet pigment dispersion.

Example C-2

A violet pigment dispersion was obtained in a similar manner as in Example C-1 except that Dispersant 2 was used in place of Dispersant 1.

Examples C-3 to C-10

Violet pigment dispersions were obtained in a similar manner as in Example C-1 except that Dispersants 3 to 10 were used, respectively, in place of Dispersant 1.

Examples C-11 & C-12

Two violet pigment dispersions were obtained in a similar manner as in Example C-1 except that Readily-dispersing pigment compositions 1 and 2 were used, respectively, in place of C.I. Pigment Violet 23 and Dispersant 1.

Comparative Example C-1

A violet pigment dispersion was obtained in a similar manner as in Example C-1 except that a commercial pigment dispersant (monosulfonated phthalocyanine blue) was used in place of Dispersant 1.

Comparative Example C-2

A violet pigment dispersion was obtained in a similar manner as in Example C-1 except that a commercial pigment dispersant (the quaternary ammonium salt of monosulfonated phthalocyanine blue) was used in place of Dispersant 1.

The average particle sizes of the pigments in the violet pigment dispersions of Examples C-1 to C-12 and Comparative Examples C-1 and C-2 were measured. To determine the storage stability of the violet pigment dispersions, they were stored at room temperature for 1 month during which their viscosity variations were measured. Using a Brookfield rotational viscometer, their viscosities were measured at a rotor speed of 6 rpm. To investigate spectral transmittance characteristics, the violet pigment dispersions were separately applied to glass substrates on a spinner, and after drying, the transmittances of the resulting coating films were measured at a wavelength of 440 nm. The results are presented in Table 1.

As is evident from Table 1, the coating films formed from the violet pigment dispersions of Examples C-1 to C-12 were apparently higher in maximum light transmittance than those formed from the violet pigment dispersions of Comparative Examples C-1 and C-2, and further, the violet pigment dispersions of Examples C-1 to C-12 were clearly lower in both initial viscosity and post-storage viscosity (1 month later) than the violet pigment dispersions of Comparative Examples C-1 and C-2.

Examples of the Coating Fluid for Color Filters

Example D-1

A blue pigment dispersion was obtained by a similar procedure as in Example C-1 except that C.I. Pigment Blue 15:6 was used in place of C.I. Pigment Violet 23. As is presented in Table 2, that blue pigment dispersion was low in both initial viscosity and post-storage viscosity (1 month later), and had excellent properties as a coating fluid for color filters.

Example D-2

A green pigment dispersion was obtained by a similar procedure as in Example C-1 except that C.I. Pigment Green 36 was used in place of C.I. Pigment Violet 23. As is presented in Table 2, that green pigment dispersion was also low in both initial viscosity and post-storage viscosity (1 month later), and also had excellent properties as a coating fluid for color filters.

Example D-3

A black pigment dispersion was obtained by a similar procedure as in Example C-1 except that C.I. Pigment Black 7 was used in place of C.I. Pigment Violet 23. As is presented in Table 2, that black pigment dispersion was also low in both initial viscosity and post-storage viscosity (1 month later), and also had excellent properties as a coating fluid for color filters (for black matrices).

TABLE 1

| Pigment dispersion | Transmittance of coating film (%) | Viscosity (mPa·s) Initial | Viscosity (mPa·s) 1 month later | Average particle size (nm) |
|---|---|---|---|---|
| Example C-1 | 59.0 | 10.2 | 10.7 | 92.1 |
| Example C-2 | 57.4 | 8.3 | 8.3 | 90.6 |
| Example C-3 | 57.4 | 7.0 | 7.3 | 92.8 |
| Example C-4 | 51.4 | 7.7 | 7.7 | 97.0 |
| Example C-5 | 58.2 | 11.5 | 10.2 | 98.8 |
| Example C-6 | 55.0 | 8.5 | 9.0 | 100.1 |
| Example C-7 | 54.0 | 8.0 | 8.2 | 95.4 |
| Example C-8 | 53.2 | 8.9 | 8.9 | 97.0 |
| Example C-9 | 57.9 | 9.5 | 9.0 | 92.0 |
| Example C-10 | 59.0 | 9.3 | 9.3 | 98.8 |
| Example C-11 | 58.2 | 8.0 | 7.9 | 95.0 |
| Example C-12 | 56.0 | 8.7 | 11.5 | 90.5 |
| Comp. Ex. C-1 | 39.0 | 45.0 | 120.5 | 207.2 |
| Comp. Ex. C-2 | 42.4 | 10.9 | 98.0 | 164.5 |

TABLE 2

| Coating fluid for color filters | Maximum transmittance (380-780 nm) (%) | Viscosity (mPa·s) Initial | Viscosity (mPa·s) 1 month later | Average particle size (nm) |
|---|---|---|---|---|
| Example D-1 | 85.9 | 12.8 | 12.9 | 65.4 |
| Example D-2 | 86.9 | 13.4 | 14.0 | 64.7 |
| Example D-3 | 0.1 | 12.5 | 13.5 | 117.5 |

Referential Example 1

Added to the same acrylic resin varnish (50 parts) as that used in Example C-1 were anthraquinonyl red pigment (C.I. Pigment Red 177) (17 parts), isoindolinone yellow pigment (C.I. Pigment Yellow 139) (3 parts), 2,4-bis[anthraquinonyl(-1')-amino]-6-(N,N-dimethylamino)eth ylamino-s-triazine (2 parts) as a pigment dispersant, and PMA (20 parts) as a solvent. Subsequent to premixing, the pigments were dispersed in a horizontal beads mill to obtain a red pigment dispersion.

Referential Example 2

A green pigment dispersion was obtained by a similar procedure as in Referential Example 1 except that C.I. Pigment Green 36 (17 parts) and quinophthalone yellow pigment (C.I. Pigment Yellow 138) (13 parts) were used in place of the pigments.

Examples of the Process for Fabricating a Color Filter

Example E-1

To fabricate an RGB color filter, an R, G and B coating fluids for the color filter were obtained in accordance with the formulations presented below in Table 3.

TABLE 3

| Formulation (parts) | Coating fluid for color filter | | |
|---|---|---|---|
|  | R | G | B |
| Red pigment dispersion of Referential Example 1 | 100 | — | — |
| Green pigment dispersion of | — | 100 | — |

TABLE 3-continued

| Formulation (parts) | Coating fluid for color filter | | |
|---|---|---|---|
|  | R | G | B |
| Referential Example 2 |  |  |  |
| Blue pigment dispersion of Example D-1 | — | — | 85 |
| Violet pigment dispersion of Example C-1 | — | — | 15 |
| Acrylic resin varnish | 50 | 50 | 50 |
| Trimethylolpropane acrylate | 10 | 10 | 10 |
| 2-Hydroxy-2-methylpropiophenone | 2 | 2 | 2 |
| 2,2-Diethoxyacetophenone | 1 | 1 | 1 |
| PMA | 37 | 37 | 37 |
| Total | 200 | 200 | 200 |

A glass substrate, which had been treated with a silane coupling agent, was set on a spin coater, and the red pigment dispersion in Table 3 was spin-coated firstly at 300 rpm for 5 seconds and then at 1,200 rpm for 5 seconds. Prebaking was then conducted at 80° C. for 10 minutes. A photomask having a mosaic pattern was brought into a contiguous relation with the prebaked coating film, and under an extra-high pressure mercury vapor lamp, exposure was conducted at an exposure dose of 100 mJ/cm$^2$. Development and washing were then conducted with an exclusive developer and an exclusive rinse, respectively, to form a red mosaic pattern (pixels) on the glass substrate.

Using the green pigment dispersion and blue pigment dispersion in Table 3, a green mosaic pattern and blue mosaic pattern were then formed by conducting coating and baking by a similar process as described above, so that a color filter having RGB pixels was obtained. The thus-obtained color filter had excellent light permeability, was excellent in fastness properties such as light fastness and heat resistance, and was also superb in light transmittance characteristics.

The organic pigment dispersant according to the present invention can disperse various organic pigments at high concentration and low viscosity and with high stability in dispersion media such as paints, printing inks, and coating fluids for color filters. The readily-dispersing pigment composition and dispersion according to the present invention are useful as colorants for coating fluids for color filters and, when C.I. Pigment Blue 15:6 and C.I. Pigment Violet 23 are combined as a pigment, make it possible to form blue pixels which have excellent spectral transmittance characteristics, are vivid, bright and highly transparent, and are superb in various fastness properties such as light fastness, heat resistance, solvent resistance, chemical resistance and waterproofness.

This application claims the priority of Japanese Patent Application 2003-302714 filed Aug. 27, 2003, which is incorporated herein by reference.

What is claimed is:

1. A colored coating fluid comprising:
ε-phthalocyanine blue (C.I. Pigment Blue 15:6) and dioxazine violet (C.I. Pigment Violet 23) present in proportions of 3 to 50 parts by weight of dioxazine violet per 100 parts by weight of ε-phthalocyanine blue, a dispersant, and
a resin varnish, wherein said dioxazine violet and ε-phthalocyanine blue are dispersed with said dispersant in said resin varnish and wherein said dispersant comprises at least one compound selected from the group consisting of compounds represented by formula (1):

wherein which $R_1$ and $R_2$ may be the same or different and each independently represents a hydrogen atom, a halogen atom, a hydroxyl group, a primary, secondary or tertiary amino group, an alkyl group, a substituted or unsubstituted aryl group or a substituted or unsubstituted phthalimidomethyl group, $R_3$ and $R_4$ may be the same or different and each independently represents a hydrogen atom or a lower alkyl group, and n means an average number of sulfonic groups and stands for a number of from 0.5 to 3; metal salts thereof, ammonium salts thereof, organic amine salts thereof and organic quaternary ammonium salts thereof.

2. A fluid according to claim 1, wherein $R_1$ and $R_2$ each independently represents a hydrogen atom or a chlorine atom, and $R_3$ and $R_4$ each independently represents a hydrogen atom or a methyl group.

3. A fluid according to claim 2, wherein in formula (1) n is 1.0 to 1.5.

4. A fluid according to claim 1, wherein said dispersant is an organic quaternary ammonium salt represented by the following formula (2):

wherein which $R_1$ and $R_2$ may be the same or different and each independently represents a hydrogen atom, a halogen atom, a hydroxyl group, a primary, secondary or tertiary amino group, an alkyl group, a substituted or unsubstituted aryl group or a substituted or unsubstituted phthalimidomethyl group, $R_3$ and $R_4$ may be the same or different and each independently represents a hydrogen atom or a lower alkyl group, and n means an average number of sulfonic groups and stands for a number of from 0.5 to 3, R5 represents an alkyl group or an aryl group and the $R_5$s may be the same or different.

5. A fluid according to claim 4, wherein in formula (2) n is 1.0 to 1.5.

6. A fluid according to claim 1, wherein in formula (1) n is 1.0 to 1.5.

7. A fluid according to claim 1, comprising 0.5 to 50 parts by weight of the dispersant per 100 parts by weight of the combination of ε-phthalocyanine blue (C.I. Pigment Blue 15:6) and dioxazine violet (C.I. Pigment Violet 23).

8. A fluid according to claim 1, comprising 1 to 30 parts by weight of the dispersant per 100 parts by weight of the combination of ε-phthalocyanine blue (C.I. Pigment Blue 15:6) and dioxazine violet (C.I. Pigment Violet 23).

9. A fluid according to claim 1, wherein said resin varnish is a photosensitive resin varnish.

10. A fluid according to claim 1, wherein said resin varnish is a non-photosensitive resin varnish.

11. A process for fabricating a color filter by forming color patterns of a red color, green color and blue color on a substrate for said color filter, which comprises forming at least said blue color pattern with a colored coating fluid according to claim 1.

12. A fluid according to claim 1, wherein said dispersant comprises at least one compound selected from the group consisting of metal salts, ammonium salts, organic amine salts and organic quaternary ammonium salts of compounds represented by formula (1):

wherein which $R_1$ and $R_2$ may be the same or different and each independently represents a hydrogen atom, a halogen atom, a hydroxyl group, a primary, secondary or tertiary amino group, an alkyl group, a substituted or unsubstituted aryl group or a substituted or unsubstituted phthalimidomethyl group, $R_3$ and $R_4$ may be the same or different and each independently represents a hydrogen atom or a lower alkyl group, and n means an average number of sulfonic groups and stands for a number of from 0.5 to 3.

13. A fluid according to claim 1, wherein said dispersant is a compound selected from the group consisting of compounds represented by formula (1):

wherein which $R_1$ and $R_2$ may be the same or different and each independently represents a hydrogen atom, a halogen atom, a hydroxyl group, a primary, secondary or tertiary amino group, an alkyl group, a substituted or unsubstituted aryl group or a substituted or unsubstituted phthalimidomethyl group, $R_3$ and $R_4$ may be the same or different and each independently represents a hydrogen atom or a lower alkyl group, and n means an average number of sulfonic groups and stands for a number of from 0.5 to 3.

* * * * *